No. 811,600. PATENTED FEB. 6, 1906.
W. TURNER.
COMBINED WEEDER, ORCHARD CULTIVATOR, AND FALLOW PLOW.
APPLICATION FILED SEPT. 5, 1905.
2 SHEETS—SHEET 1.
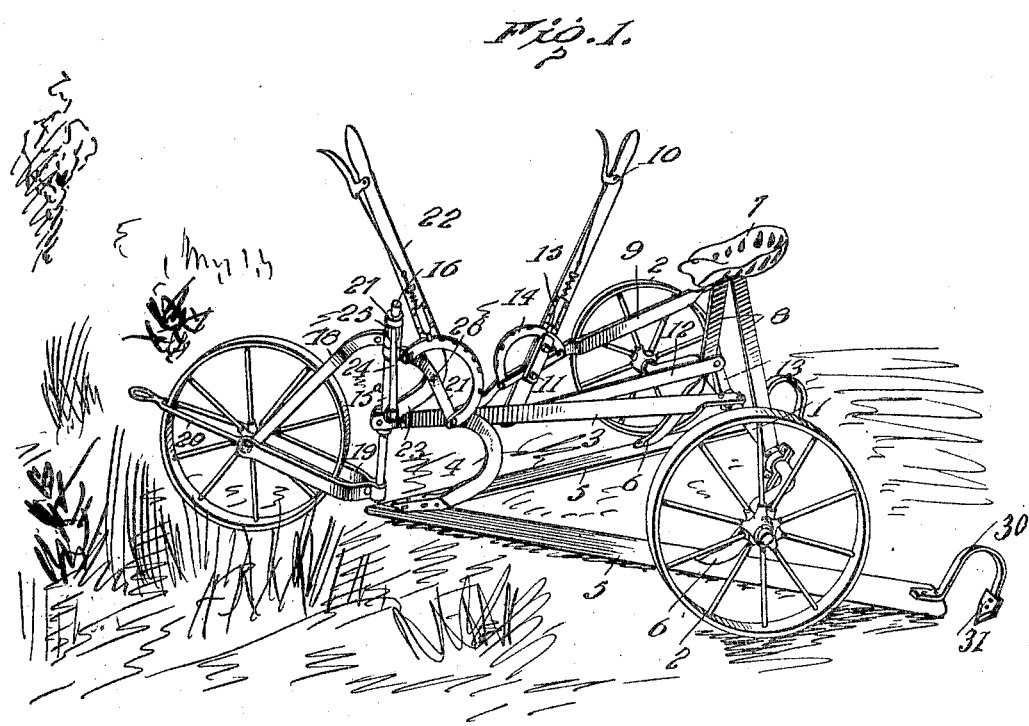
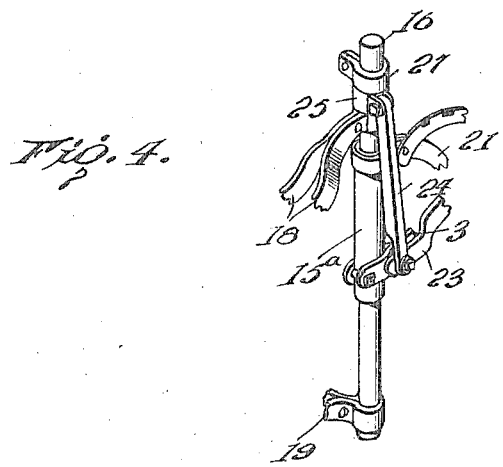

No. 811,600. PATENTED FEB. 6, 1906.
W. TURNER.
COMBINED WEEDER, ORCHARD CULTIVATOR, AND FALLOW PLOW.
APPLICATION FILED SEPT. 5, 1905.

2 SHEETS—SHEET 2.

Witnesses
W. Turner
Inventor
By
Attorneys

UNITED STATES PATENT OFFICE.

WILLIAM TURNER, OF WENATCHEE, WASHINGTON.

COMBINED WEEDER, ORCHARD-CULTIVATOR, AND FALLOW-PLOW.

No. 811,600. Specification of Letters Patent. Patented Feb. 6, 1906.

Application filed September 5, 1905. Serial No. 277,038.

*To all whom it may concern:*

Be it known that I, WILLIAM TURNER, a citizen of the United States, residing at Wenatchee, in the county of Chelan and State of Washington, have invented certain new and useful Improvements in a Combined Weeder, Orchard-Cultivator, and Summer Fallow-Plow, of which the following is a specification.

This invention relates to agricultural implements, and embodies, essentially, novel improvements in implements for cutting weeds or other foreign growth.

The weeder embodying the invention is particularly designed for use in cutting weeds in orchards, though adapted for cutting purposes generally.

For a full description of the invention and the merits thereof and also to acquire a knowledge of the details of construction of the means for effecting the result reference is to be had to the following description and accompanying drawings, in which—

Figure 2:
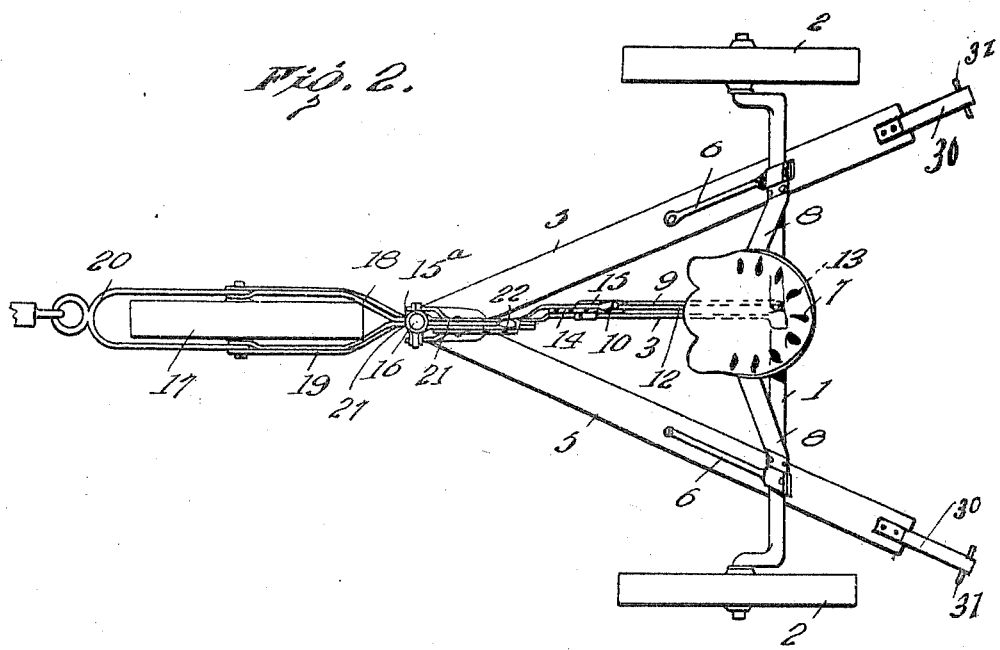
Figure 3:
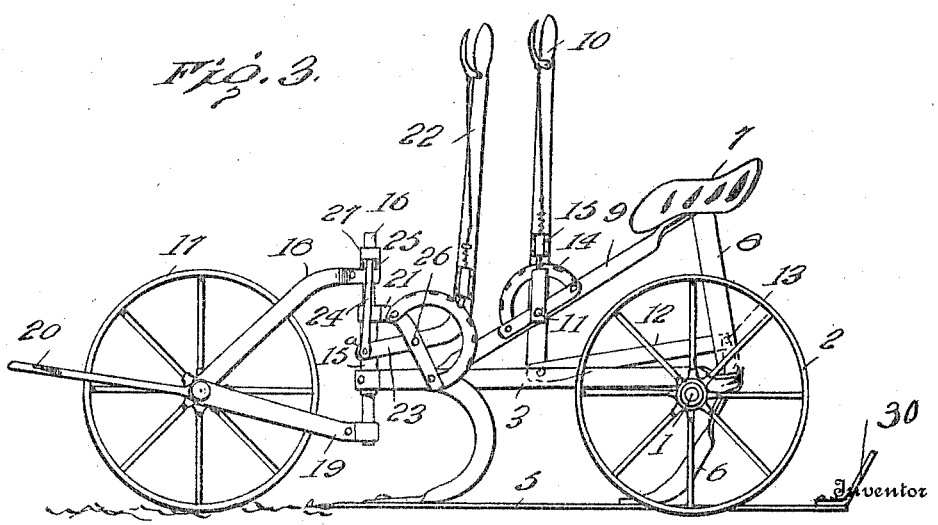

Figure 1 is a perspective view of a weeder embodying the invention. Fig. 2 is a top plan view. Fig. 3 is a side elevation. Fig. 4 is a detail perspective view of the front-wheel frame.

Corresponding and like parts are referred to in the following description and indicated in all the views of the drawings by the same reference characters.

In carrying out the invention the weeder comprises a rear axle 1 of arched formation, having the ground-wheels 2 at its ends. The frame of the weeder includes the longitudinal beam 3, attached at its rear end to the axle 1, the front end portion of the beam supporting a downwardly-extending curved standard 4. Cutting-knives 5 are employed in connection with the frame and have their forward ends connected to the lower portion of the standard 4, while their rear ends are supported by hangers or standards 6, suspended from the axle 1. The standards 6 curve forwardly and are spaced quite a distance apart, the knives or blades 5 when attached to the standards 4 and 6 extending rearwardly from the standard 4 in divergent relation, thereby getting a draw cut in the operation of cutting weeds or growth operated upon. The axle 1 also supports a suitable seat 7, attached to the upper ends of spaced bars 8, the lower ends of which are attached directly to the axle. A brace 9 connects the seat 7 with the front portion of the beam 3, and a hand-lever 10 is pivoted to the brace 9 between the ends of the latter, as shown at 11, said lever 10 being connected at its lower extremity by a rod 12 with a crank-arm 13 on the axle 1. The crank-arm 13 is arranged between the ends of the axle, and pivotal movement of the lever 10 is adapted to impart rotary movement to the axle and adjust the arched end portions thereof to raise and lower the wheels 2 with respect to the beam 3. A suitable notched bar 14 on the brace 9 is adapted to be engaged by a latch 15 on the lever 10 to fix the position of the lever with the axle 1 at a predetermined adjustment. Secured to the front extremity of the beam 3 is a vertical sleeve or bar 15′, in which is mounted a vertical shaft 16, the latter being attached to the supporting-frame, in which a front wheel 17 is mounted. The frame carrying the wheel 17 is composed of upwardly-extending spaced bars 18 and downwardly-extending bars 19, the bars 18 and 19 being secured together at the front ends and having bearings for the axle of the wheel 17. A draft-coupling 20 is secured to the axle of the wheel 17, and a swingletree or doubletree may be attached thereto, as desired. The bearing-sleeve 15′ is braced by a brace 21, secured at its upper end to the upper portion of the sleeve and at its lower end to the beam 3. Pivoted to this brace 21 is another hand-lever 22, the latter being of bell-crank form at its lower end and having its crank-arm 23 connected by a link 24 with a collar 25 on the shaft 16. The pivot of the lever 22 is shown at 26, and the said lever is adapted by rearward movement to elevate the shaft 16, the collar 25, connected with the link 15, engaging a rigid collar 27, attached to the upper extremity of said shaft.

In order to adjust the positions of the blades or knives 5, the driver of the weeder can readily grasp the rear lever 10, and by pulling the same rearwardly the crank-arm 13 will be forced forwardly and the axle 1 rotated, so as to lower the axis of the wheels 2 with regard to the beam 3, the above, of course, elevating the knives 5. The lever 22 may now be pushed forwardly and will thereby lower the shaft 16 with regard to the beam 3, and this will correspondingly elevate the knives 5 at the front portion of the frame. The positions of the knives 5 may of course be fixed at any desired position as found necessary in order to accomplish the best results under actual conditions of service.

The weeder as constructed in accordance with the invention is very simple in construction and may be manufactured at a comparatively small cost, so as to bring the same within the reach of the average farmer or persons having use for an implement of the class to which the invention appertains.

As will be noted with reference to Fig. 1, an upwardly-curving standard 30 is attached to the rear end portion of the cutting knives or blades 5, said standard carrying a small shovel 31, by which an irrigation-furrow may be made as the implement is advanced through an orchard or over the ground. The use of the attachment aforesaid is advantageous in that it saves going over the ground with a special plow for making the furrows.

Having thus described the invention, what is claimed as new is—

1. In a weeder the combination of a longitudinal beam, an axle connected to one end of the beam and provided with an arched portion, a wheel-frame adjustably connected to the opposite end of the beam, cutting-knives supported by the beam, a seat mounted upon the axle, a brace connecting the seat and the longitudinal beam, a lever mounted upon the brace, and a rod connecting the lever to the axle whereby the latter can be rotated to raise or lower the cutting-knives.

2. In a weeder, the combination of a longitudinal beam, cutting-knives supported by the beam, supporting-wheels at one end thereof, a sleeve at the opposite end thereof, a brace connecting the sleeve and the longitudinal beam, a lever mounted upon the brace, a shaft passing through the sleeve, a wheel-frame connected to the shaft, and a link connecting the lever and the shaft whereby the latter can be vertically adjusted with respect to the longitudinal beam.

3. In a weeder, the combination of a longitudinal beam, cutting-knives supported by the beam, an axle connected to the rear end of the beam and having an arched formation, a sleeve connected to the opposite end of the beam, a brace for the sleeve, a lever mounted upon said brace, a shaft passing through the sleeve, a wheel-frame connected to the shaft, a link connecting the shaft and the lever whereby the former may be vertically adjusted with respect to the longitudinal beam, a seat supported upon the rear axle, a brace for said seat, a lever mounted upon said brace, and a link member connecting the lever and the axle whereby the latter may be rotated to adjust the height of the cutting-knives.

In testimony whereof I affix my signature in presence of two witnesses.

WILLIAM TURNER. [L. S.]

Witnesses:
 VICTOR F. MARTIN,
 B. M. CHAPMAN.